US012764193B2

(12) United States Patent
Bhattacharjee et al.

(10) Patent No.: US 12,764,193 B2
(45) Date of Patent: Oct. 13, 2026

(54) SYSTEM AND METHOD OF DETERMINING ASSET CONTEXT EQUIVALENCE

(71) Applicant: Honeywell International Inc., Charlotte, NC (US)

(72) Inventors: Arnab Bhattacharjee, Bangalore (IN); Srikant Srinivasan, Bangalore (IN); Nikhil Bansal, Bangalore (IN); Vishnu Vardhana Reddy Potham, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 140 days.

(21) Appl. No.: 18/939,524

(22) Filed: Nov. 7, 2024

(65) Prior Publication Data

US 2026/0129098 A1 May 7, 2026

(51) Int. Cl.
*H04L 67/125* (2022.01)
*H04L 41/5009* (2022.01)

(52) U.S. Cl.
CPC ........ *H04L 67/125* (2013.01); *H04L 41/5009* (2013.01)

(58) Field of Classification Search
CPC ... H04L 67/125; H04L 41/5009; H04L 67/12; H04L 41/0631; H04L 43/16
See application file for complete search history.

(56) References Cited

U.S. PATENT DOCUMENTS

| | | | | |
|---|---|---|---|---|
| 11,886,475 | B1 * | 1/2024 | Swaminathan | G06Q 10/06393 |
| 2012/0304007 | A1 * | 11/2012 | Hanks | G05B 23/0229 714/E11.029 |
| 2014/0337277 | A1 * | 11/2014 | Asenjo | G06Q 10/06 707/603 |
| 2017/0364818 | A1 * | 12/2017 | Wu | G06F 11/3006 |
| 2020/0073740 | A1 * | 3/2020 | Ohana | G06F 11/0793 |
| 2023/0075005 | A1 * | 3/2023 | Wu | G05B 23/024 |
| 2025/0103039 | A1 * | 3/2025 | Bromfield | G05B 23/0283 |

* cited by examiner

*Primary Examiner* — Johnny B Aguiar
(74) *Attorney, Agent, or Firm* — Alston & Bird LLP

(57) ABSTRACT

A system and a method of determining asset context equivalence are described. The method includes collecting a first information related to an asset operating in an enterprise. The first information is collected from a first monitoring service running at a network level, and the first information includes tags assigned at network levels traversed by the first information. A Key Performance Indicator (KPI) value of the first monitoring service is determined using the first information. Upon deviation in KPI value, the asset associated with the first information is traced using the tags assigned at the network levels. A second monitoring service associated with the asset is identified, a second information is collected from the second monitoring service and used for performing a root cause analysis, to determine a cause of the deviation. An action related to the asset is taken to remediate the cause of the deviation in the KPI value.

20 Claims, 9 Drawing Sheets

SYSTEM AND METHOD OF DETERMINING ASSET CONTEXT EQUIVALENCE

TECHNICAL FIELD

Present disclosure relates to performing root cause analysis, and more specifically relates to performing root cause analysis by determining asset context equivalence.

BACKGROUND

Within an enterprise, several assets i.e. machineries operate to perform different tasks and sensors track operation of the machineries. Sensor data is provided to different control systems responsible for running monitoring services related to the operations. The control systems run the monitoring services at different network levels. For example, Purdue model defines operation of different monitoring services at five levels. At level 0, a physical process runs. At level 1, sensors and devices operate to manipulate the physical process. At level 2, control systems operate for performing supervising, monitoring, and controlling of the physical process. At level 3, manufacturing operations systems operate for managing production workflow to produce desired products. At level 4, business logistics systems operate, and at level 5, an external support or network cloud access is provided.

Different KPIs are defined and continuously monitored for tracking operational performance of the assets. In case of a deviation in a KPI value, a user may not be able to identify an anomaly associated with an asset that might have resulted in the deviation. Further, in several situations, it might not be possible to derive an inference of root cause from the data used for determining the KPI value. Thus, a method using which root cause analysis could be performed in above mentioned conditions is desired.

SUMMARY OF THE INVENTION

In one embodiment, a method of performing root cause analysis by determining asset context equivalence is described. The method includes collecting, from a first monitoring service running at one of a plurality of network levels, a first information related to an asset of a plurality of assets operating in an enterprise. The first information includes at least one tag assigned at each of the plurality of network levels traversed by the first information for reaching the first monitoring service from the asset. The method further includes determining a Key Performance Indicator (KPI) value of the first monitoring service, using the first information. The method further includes determining a deviation in the KPI value of the first monitoring service upon comparison with a threshold KPI value. The method further includes tracing the asset associated with the first information resulting in the deviation in the KPI value. The asset is traced using the at least one tag assigned at each of the plurality of network levels. The method further includes identifying a second monitoring service associated with the asset, to determine asset equivalence between the first monitoring service and the second monitoring service. The second monitoring service runs at one of the plurality of network levels. The method further includes collecting, from the second monitoring service, a second information related to the asset. The method further includes performing a root cause analysis, by processing the second information, to determine a cause of the deviation in the KPI value. The method further includes taking an action related to the asset to remediate the cause of the deviation in the KPI value.

In an aspect, the plurality of assets include machineries and sensors operating in the enterprise.

In an aspect, the KPI value is determined by combining values of different operational parameters included in the first information.

In an aspect, the threshold KPI value is user defined.

In an aspect, the threshold KPI value is set based on historical performance of the first monitoring service.

In an aspect, the at least one tag assigned at each of the plurality of network levels include timestamps and asset identifiers.

In an aspect, the at least one tag assigned at each of the plurality of network levels are stored in a sequentially linked manner.

In an aspect, the first monitoring service and the second monitoring service are configured to operate at different network levels.

In an aspect, the second monitoring service utilizes the second information associated with another asset operating in the enterprise.

In an aspect, the action related to the asset includes segmentation, notification and communication, service restart or device reboot, configuration changes, patch management, resource optimization, backup and restore, and monitoring and prevention.

In one embodiment, a system for performing root cause analysis by determining asset context equivalence is described. The system comprises a processor and a memory coupled with the memory. The memory stores program instructions configured to collect, from a first monitoring service running at one of a plurality of network levels, a first information related to an asset of a plurality of assets operating in an enterprise. The first information includes at least one tag assigned at each of the plurality of network levels traversed by the first information for reaching the first monitoring service from the asset. The memory further stores program instructions configured to determine a Key Performance Indicator (KPI) value of the first monitoring service, using the first information. The memory further stores program instructions configured to determine a deviation in the KPI value of the first monitoring service upon comparison with a threshold KPI value. The memory further stores program instructions configured to trace the asset associated with the first information resulting in the deviation in the KPI value. The asset is traced using the at least one tag assigned at each of the plurality of network levels. The memory further stores program instructions configured to identify a second monitoring service associated with the asset, to determine asset equivalence between the first monitoring service and the second monitoring service. The second monitoring service runs at one of the plurality of network levels. The memory further stores program instructions configured to collect, from the second monitoring service, a second information related to the asset. The memory further stores program instructions configured to perform a root cause analysis, by processing the second information, to determine a cause of the deviation in the KPI value. The memory further stores program instructions configured to take an action related to the asset to remediate the cause of the deviation in the KPI value.

In an aspect, the plurality of assets include machineries and sensors operating in the enterprise.

In an aspect, the KPI value is determined by combining values of different operational parameters included in the first information.

In an aspect, the threshold KPI value is user defined or is set based on historical performance of the first monitoring service.

In an aspect, the at least one tag assigned at each of the plurality of network levels include timestamps and asset identifiers.

In an aspect, the at least one tag assigned at each of the plurality of network levels are stored in a sequentially linked manner.

In an aspect, the first monitoring service and the second monitoring service are configured to operate at different network levels.

In an aspect, the second monitoring service utilizes the second information associated with another asset operating in the enterprise.

In an aspect, the action related to the asset includes segmentation, notification and communication, service restart or device reboot, configuration changes, patch management, resource optimization, backup and restore, and monitoring and prevention.

In one embodiment, a non-transitory computer-readable storage medium for performing root cause analysis by determining asset context equivalence is described. The non-transitory computer-readable storage medium comprises a computer program code for execution by one or more processors of an apparatus. The computer program code is configured to, when executed by the one or more processors, cause the apparatus to collect, from a first monitoring service running at one of a plurality of network levels, a first information related to an asset of a plurality of assets operating in an enterprise. The first information includes at least one tag assigned at each of the plurality of network levels traversed by the first information for reaching the first monitoring service from the asset. The computer program code is further configured to cause the apparatus to determine a Key Performance Indicator (KPI) value of the first monitoring service, using the first information. The computer program code is further configured to cause the apparatus to determine a deviation in the KPI value of the first monitoring service upon comparison with a threshold KPI value. The computer program code is further configured to cause the apparatus to trace the asset associated with the first information resulting in the deviation in the KPI value. The asset is traced using the at least one tag assigned at each of the plurality of network levels. The computer program code is further configured to cause the apparatus to identify a second monitoring service associated with the asset, to determine asset equivalence between the first monitoring service and the second monitoring service. The second monitoring service runs at one of the plurality of network levels. The computer program code is further configured to cause the apparatus to collect, from the second monitoring service, a second information related to the asset. The computer program code is further configured to cause the apparatus to perform a root cause analysis, by processing the second information, to determine a cause of the deviation in the KPI value. The computer program code is further configured to cause the apparatus to take an action related to the asset to remediate the cause of the deviation in the KPI value.

BRIEF DESCRIPTION OF THE DRAWINGS

The accompanying drawings constitute a part of the description and are used to provide further understanding of the present disclosure. Such accompanying drawings illustrate the embodiments of the present disclosure which are used to describe the principles of the present disclosure. The embodiments are illustrated by way of example and not by way of limitation in the figures of the accompanying drawings in which like references indicate similar elements. It should be noted that references to “an” or “one” embodiment in this disclosure are not necessarily to the same embodiment, and they mean at least one. In the drawings.

DETAILED DESCRIPTION OF THE INVENTION

Figure 1:
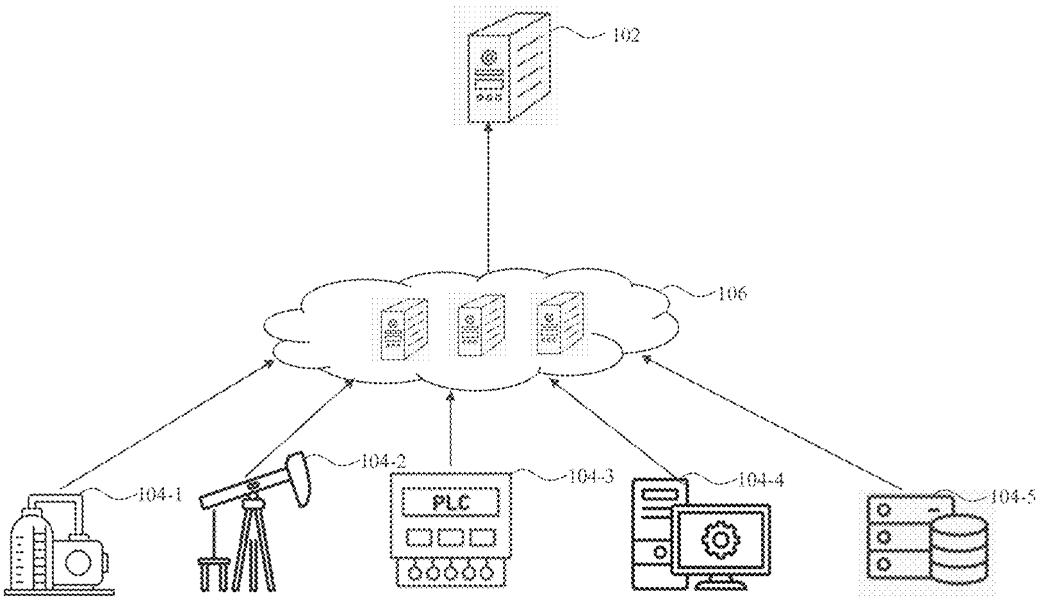
FIG. 1 illustrates a network connection diagram of a system for determining asset context equivalence, in accordance with an embodiment of the present disclosure.

The present disclosure provides a system and a method of determining asset context equivalence. In one implementation, different monitoring services related to several assets might operate at different network levels. A first monitoring service running at a network cloud may utilize data (alternatively referred as a first information) related to an asset. To reach the first monitoring service, the first information traverses/hops through different network levels. During traversal through each network level, a tag is assigned to the first information. For example, a tag T1 may be assigned to the first information at the network level L2, a tag T2 may be assigned to the first information at a network level L3, and so on. All the tags may be stored in a sequential manner, in a sequence of their allocation, to form a tag lineage.

A Key Performance Indicator (KPI) value of the first monitoring service may be determined using the first information. The KPI value may be compared with a threshold KPI value which may be predefined or determined based on historical performance of the first monitoring service. Upon comparison, a deviation in the KPI value may be identified.

Upon identification of the deviation in the KPI value, the first information may be provided to a fault management/diagnostic service by the first monitoring service. The fault management service identifies the asset associated with the first information resulting in the deviation in the KPI value. The fault management service traces/locates the asset using the tag lineage. With this, the fault management service may understand that there is some fault associated with the asset, but may not able to comprehend the fault using the first information. For such reason, the fault management service identifies a second monitoring service utilizing a second information associated with the asset. Identification of the second monitoring service enables development of asset equivalence between the first monitoring service and the second monitoring service i.e. understanding that both monitoring services relate to and derive information from same asset. In scenarios where the second monitoring service related to the same asset could not be identified, the fault management service identifies another asset operating at a same network level as that of the asset, and identifies a third monitoring service associated with the other asset. Successively, the fault management service retrieves a third information from the third monitoring service.

Thereupon, the fault management service performs a root cause analysis by processing the second information or the third information, to determine a cause of the deviation in the KPI value. By performing the root cause analysis, the fault management service identifies a fault associated with the asset, and takes one or more corrective actions to address the fault, to bring the KPI value in a required range. In this manner, proposed system and method ensure normal operation of assets in the enterprise.

FIG. 1 illustrates a network connection diagram of a system 102 for determining asset context equivalence, in accordance with an embodiment of the present invention. The system 102 may be a data processing device such as a server running a fault management/diagnostic service. The server may be implemented over a cloud network. The system 102 may communicate with several assets 104-1 to 104-*n* (collectively referred as assets 104) operating in an enterprise. For example, the assets 104 may include mechanical equipment like an industrial boiler 104-1 or a petroleum extraction unit 104-2. Alternatively or additionally, the assets 104 may include electrical equipment like a Programmable Logic Controller (PLC) 104-3. Alternatively or additionally, the assets 104 may include digital equipment like a workstation 104-4 or a data warehouse 104-5. It must be understood that the system 102 may also communicate with other types of assets different from the ones mentioned above.

The system 102 may communicate with the assets 104 through a computer network 106. The communication network 106 may be a wired and/or a wireless network. The communication network 106 may be implemented using communication techniques such as Visible Light Communication (VLC), Worldwide Interoperability for Microwave Access (WiMAX), Long Term Evolution (LTE), Wireless Local Area Network (WLAN), Infrared (IR) communication, Public Switched Telephone Network (PSTN), Radio waves, and other communication techniques known in the art.

The communication network 106 may utilize network components to establish connection between the system 102 and the assets 104. The network components may include, hubs, switches, routers, bridges, and repeaters. The routers may be of different types such as Provide Edge (PE) routers, Customer Edge (CE) routers, and intermediate routers. The switches and the routers are primary network components, wherein the switches are used to connect the user device present within a network, and the routers are used to connect multiple networks.

Within or outside the communication network 106, different computing devices like a desktop or a server may run different monitoring services. For example, a pressure monitoring service (alternatively referred as a first monitoring service) and a temperature monitoring service (alternatively referred as a second monitoring service) related to the industrial boiler 104-1 may be running over two different computing devices. Such computing devices may be operating at different network levels.

The system 102 communicates with a computing device running the first monitoring service and collect a first information related to the industrial boiler 104-1. For example, the first information may include different operational parameters such as pressure values over a particular time period, position of pressure control valves, functional status of the pressure control valves. A tag is also assigned to the first information at each network level traversed by the first information, for reaching the first monitoring service from the asset. Therefore, the first information also includes one or more tags corresponding to the network levels traversed.

The system 102 determines a Key Performance Indicator (KPI) value of the first monitoring service, using the first information. The KPI value may be determined by combining values of the operational parameters included in the first information. Successively, the system 102 determines a deviation in the KPI value of the first monitoring service. The system 102 may determine the deviation upon comparison of the KPI value with a threshold KPI value. The threshold KPI value may be predefined based on historical KPI values of the first monitoring service.

Upon determining the deviation in the KPI value, the system 102 traces an asset associated with the first information that resulted in the deviation in the KPI value i.e. the industrial boiler 104-1. The industrial boiler 104-1 may be traced using the tag assigned to the first information at each network traversed by the first information.

Successively, the system 102 identifies a second monitoring service associated with the industrial boiler 104-1. The second monitoring service may be operating at a similar or a different network level than that of the first monitoring service. With identification of the second monitoring service, the system 102 determines an asset equivalence between the first monitoring service and the second monitoring service i.e. it is determined that the first monitoring service and the second monitoring service utilize data originating from same asset, the industrial boiler 104-1.

From the second monitoring service, the system 102 collects a second information related to the industrial boiler 104-1. As the second monitoring service is a temperature monitoring service, the second information may include different operational parameters such as temperature values over a particular time period, coolant flow rate, and position of coolant flow valves. Using the second information, the system 102 may perform a root cause analysis. By performing the root cause analysis, the system 102 determines a cause of the deviation in the KPI value. For example, in one scenario, the system 102 may determine that the industrial boiler 104-1 is not performing normally, and has high temperature. In such scenario, the system 102 may determine that a thermostat installed in the industrial boiler 104-1 has become faulty. The system 102 may instruct a user/operator to replace the thermostat. By performing such repair work, the cause of the deviation in the KPI value is remediated.

In the above described manner, the system 102 determines asset context equivalence, identifies relevant data streams, and performs root cause analysis for different machineries operating in an enterprise.

Figure 2:
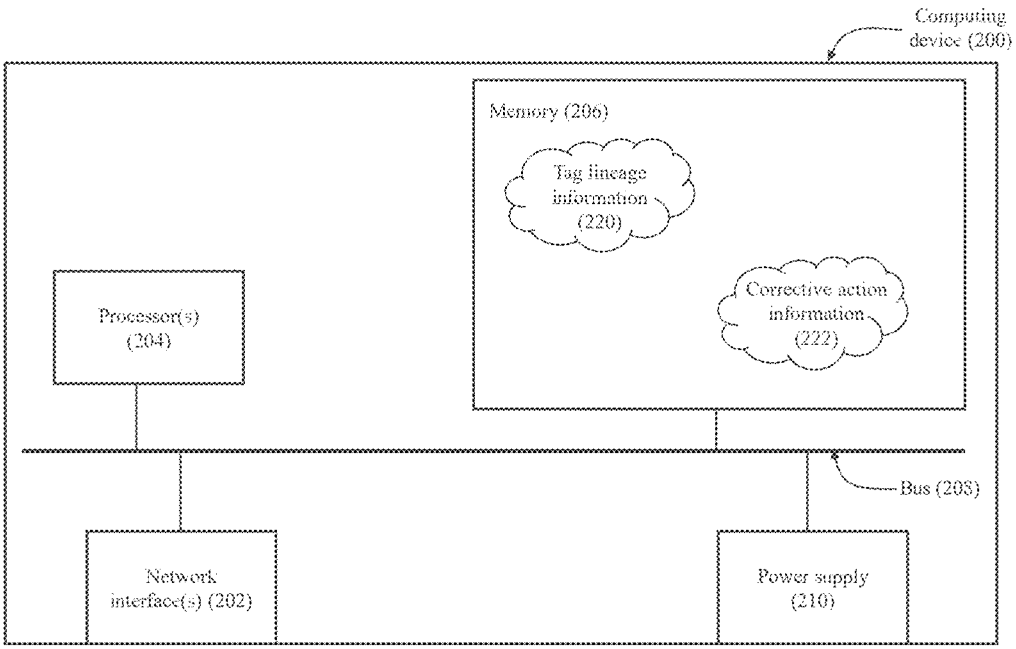
FIG. 2 illustrates a block diagram of an example computing device for determining asset context equivalence, in accordance with an embodiment of the present disclosure.

FIG. 2 illustrates a block diagram of an example computing device 200 (similar to the system 102) for determining asset context equivalence, in accordance with an embodiment of the present disclosure. The computing device 200 may be implemented remotely over a cloud network or locally. The computing device 200 may comprise one or more network interfaces 202 (e.g., wired, wireless, etc.), at least one processor 204, a memory 206 interconnected by a system bus 208, and a power supply 210.

The one or more network interfaces 202 may be used to provide input or fetch output from the computing device 200. The one or more network interfaces 202 may be implemented as a Command Line Interface (CLI) or a Graphical User Interface (GUI). Further, Application Programming Interfaces (APIs) may also be used for remotely interacting with edge systems and cloud servers.

The processor 204 may include one or more general purpose processors (e.g., INTEL® or Advanced Micro Devices® (AMD) microprocessors) and/or one or more special purpose processors (e.g., digital signal processors or Xilinx® System On Chip (SOC) Field Programmable Gate Array (FPGA) processor), MIPS/ARM-class processor, a microprocessor, a digital signal processor, an application specific integrated circuit, a microcontroller, a state machine, or any type of programmable logic array.

The memory 206 may include, but is not limited to, non-transitory machine-readable storage devices such as hard drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, or other type of media/machine-readable medium suitable for storing electronic instructions.

The memory 206 comprises a plurality of storage locations that are addressable by the processor 204 and the network interfaces 202 for storing software programs and other necessary information (tag lineage information 220 and corrective action information 222) associated with the embodiments described herein. The processor 204 may comprise hardware elements or hardware logic adapted to execute the software programs and manipulate data structures.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Figure 3:
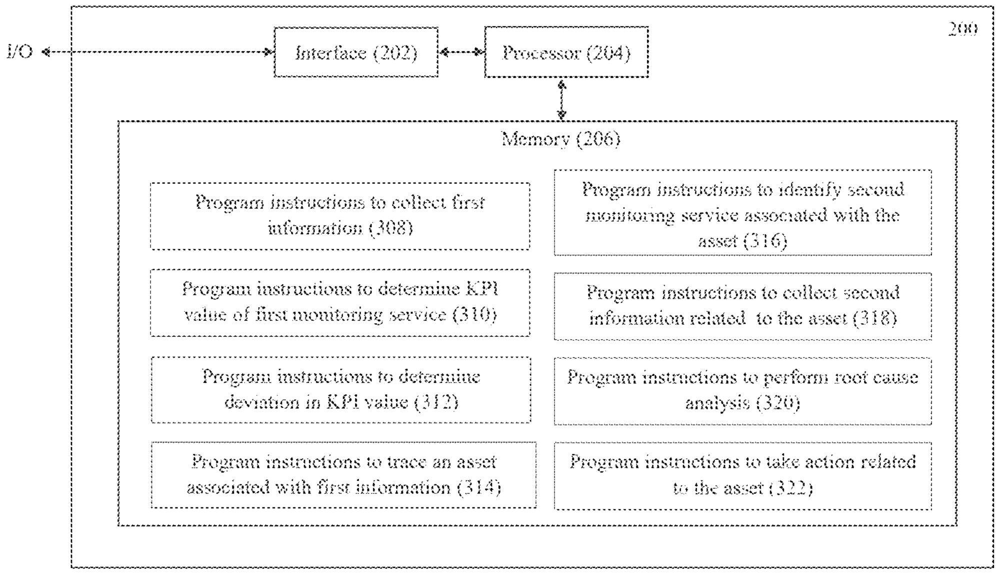
FIG. 3 illustrates a block diagram of the computing device comprising program instructions for determining asset context equivalence, in accordance with an embodiment of the present disclosure.

FIG. 3 illustrates a block diagram of the computing device 200 comprising program instructions for determining asset context equivalence, in accordance with an embodiment of the present disclosure. The memory 206 of the computing device 200 may store program instructions for performing several functions associated with prediction of the key event. Functional code stored in the memory 206 may include program instructions to collect a first information 308, program instructions to determine KPI value of a first monitoring service 310, program instructions to determine deviation in the KPI value 312, program instructions to trace an asset associated with the first information 314, program instructions to identify a second monitoring service associated with the asset 316, program instructions to collect a second information related to the asset 318, program instructions to perform root cause analysis 320, and program instructions to take an action related to the asset 322.

The program instructions to collect the first information 308 may cause the processor 204 to collect, from a first monitoring service running at one of a plurality of network levels, the first information related to an asset. The asset may be one of a plurality of assets operating in an enterprise, such as machineries and sensors. The first information includes at least one tag assigned at each of the plurality of network levels traversed by the first information for reaching the first monitoring service from the asset. The at least one tag assigned at each of the plurality of network levels may include timestamps and asset identifiers. Tags assigned at each of the plurality of network levels are stored in a sequentially linked manner.

The program instructions to determine a KPI value of a first monitoring service 310 may cause the processor 204 to determine the KPI value using the first information. The KPI value is determined by combining values of different operational parameters included in the first information. The program instructions to determine deviation in the KPI value 312 may cause the processor 204 to determine the deviation in the KPI value of the first monitoring service upon comparison with a threshold KPI value. The threshold KPI value may be user defined or set based on historical performance of the first monitoring service.

The program instructions to trace an asset associated with the first information 314 may cause the processor 204 to trace the asset associated with the first information resulting in the deviation in the KPI value. The asset is traced using the at least one tag assigned at each of the plurality of network levels.

The program instructions to identify a second monitoring service associated with the asset 316 may cause the processor 204 to identify the second monitoring service associated with the asset. The second monitoring service might be configured to operate at a same or different network level than that of the first monitoring service. With identification of the second monitoring service, an asset equivalence between the first monitoring service and the second monitoring service is determined.

The program instructions to collect a second information related to the asset 318 may cause the processor 204 to collect the second information from the second monitoring service. The program instructions to perform root cause analysis 320 may cause the processor 204 to perform the root cause analysis by processing the second information. By performing the root cause analysis, a cause of the deviation in the KPI value is determined. The program instructions to take an action related to the asset 322 may cause the processor 204 to take the action to remediate the cause of the deviation in the KPI value. A detailed explanation of the method is provided successively with reference to FIGS. 4 to 8.

Figure 4:
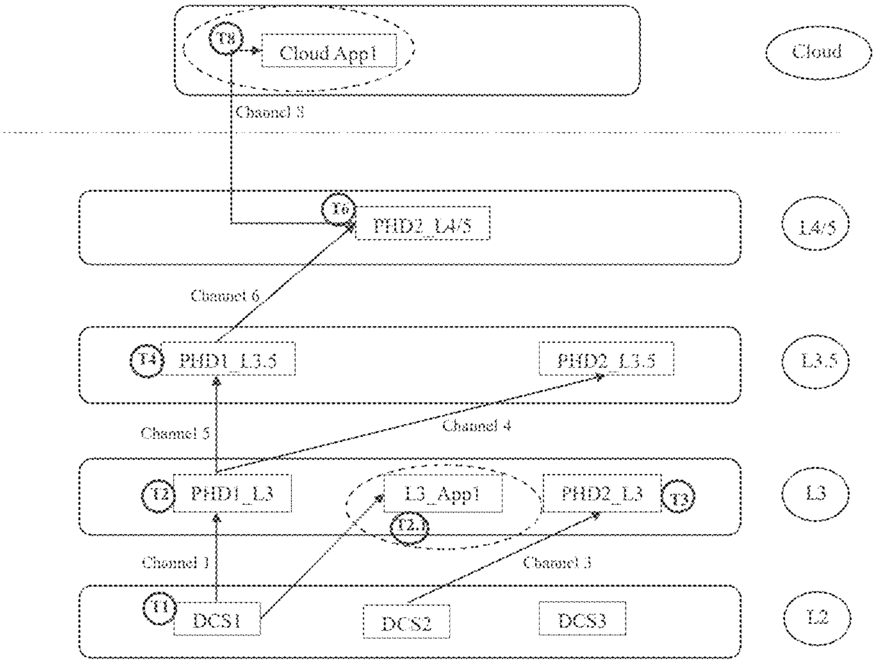
FIG. 4 illustrates an information flow diagram for different monitoring services determining asset context equivalence, in accordance with an embodiment of the present disclosure.

FIG. 4 illustrates an information flow diagram for different monitoring services determining asset context equivalence, in accordance with an embodiment of the present disclosure. As illustrated in FIG. 4, assets DCS1, DCS2, and DCS3 are operating at a network level L2. A first monitoring service (cloud app1) running at a network cloud utilizes data (henceforth referred as a first information) related to the asset DCS1. To reach the first monitoring service (cloud app1), the first information traverses/hops through different network levels. During traversal through each network level, a tag is assigned to the first information.

Tags are used for labelling of information for organizing, categorizing, and retrieving the information efficiently. The 'tags' refer to metadata labels assigned to various data points, signals, or measurements within the OT layer, such as temperature readings, motor speeds, pressure levels, or other real-time operational data. Tags are often created and managed in the OT systems (like SCADA, PLCs, or DCS systems) to identify, monitor, and organize data from physical assets or processes. Tags help in tracking data lineage by linking raw data in OT systems to the processed data in IT systems, enabling data integrity, and ensuring data origin is traceable across systems. The tags can be of different types. Metadata tags are used for providing a brief description or title of content, and include details of author, date of creation and date of modification. Descriptive tags provide keywords and summary. The keywords are specific terms describing the content, aiding in searchability, e.g., SEO, data analysis. The summary provides a brief overview of the content's key points or findings.

Contextual tags are used for indicating a project name and version. The project name includes tagging information related to a specific project or initiative, and the version is the version of the document or information, e.g., v1.0, draft. Status tags indicates the status as draft, published, or archived. Draft status indicates that the content is in progress. Published status signifies that the content is complete and publicly available. Archived status marks content that is no longer actively used but retained for reference. Collaborative tags are used for indicating reviewers and their comments. The reviewer denotes names of individuals who reviewed or contributed to the content, and the comments indicate areas where feedback or discussion is needed.

Technical Tags provides details of file format, such as PDF, DOCX, or JPEG, and language, such as English or Spanish. Location tags may be geotags or event tags. The geotags provide geographic information indicating where the content was created or is relevant, e.g., coordinates, city names.

As illustrated in FIG. 4, a tag T1 is assigned to the first information at the network level L2, a tag T2 is assigned to the first information at a network level L3, a tag T4 is assigned to the first information at a network level L3.5, a tag T6 is assigned to the first information at a network level L4/5, and a tag T8 is assigned to the first information at the cloud network. All the tags are stored in a sequential manner, in a sequence of their allocation, to form a tag lineage (T8-T6-T4-T2-T1). The tags may be stored as the tag lineage information 220.

A Key Performance Indicator value (KPI1) of the first monitoring service (cloud app1) may be determined using the first information. KPIs are quantifiable measures used to gauge the performance of an organization, team, or individual against defined objectives. KPIs provide a clear understanding of how well an enterprise is achieving its goals, enabling informed decision-making and strategic adjustments.

The KPIs can be categorized into various types based on the area of focus. Operational KPIs are used for monitoring efficiency ratio, order fulfilment time, and production downtime. Efficiency ratio is a factor for assessing how well an enterprise uses its resources, often calculated as expenses divided by revenues. Order fulfilment time is a factor used for measuring time taken from receiving an order to delivering the product, reflecting operational efficiency. Production downtime is a factor used for tracking amount of time production is halted, highlighting potential inefficiencies.

In one implementation, the first monitoring service (cloud app1) determines the KPI1 as a function of T8. Therefore, below mentioned relation could be established for the KPI1.

$$KPI1 = f(T8)$$

The KPI value (KPI1) may be compared with a threshold KPI value which may be predefined or determined based on historical performance of the first monitoring service (cloud app1).

The threshold KPI value may be set based on historical data analysis involving trend analysis and benchmarking. Trend analysis is used for examining historical performance data to understand typical ranges for each KPI. For example, patterns, seasonal variations, and anomalies are looked. Benchmarking involves comparing performance against industry standards or best practices to set realistic and competitive thresholds.

Alternatively, the threshold KPI value may be set by consulting stakeholders which may involve taking inputs from teams and cross-functional collaboration. Relevant stakeholders e.g., department heads, team members could be engaged to gather insights on what they consider acceptable performance levels. Cross-functional collaboration could be done across departments to ensure that thresholds reflect various perspectives and operational realities.

Alternatively, the threshold KPI value may be set using statistical methods, such as control charts and standard deviation. Standard deviation of historical data could be used to calculate the threshold KPI value. For example, setting a threshold at one or two standard deviations from the mean can provide a data-driven basis for limits. Control charts could be implemented to visually monitor KPIs over time and identify out-of-control situations.

From the comparison of the KPI value (KPI1) and the threshold KPI value, a deviation in the KPI value (KPI1) may be identified. Upon identification of the deviation in the KPI value (KPI1), the first information is provided to the fault management service by the first monitoring service (cloud app1). In one implementation, the fault management service identifies the asset (DCS1) associated with the first information resulting in the deviation in the KPI value (KPI1). The fault management service traces/locates the asset (DCS1) using the tag lineage (T8-T6-T4-T2-T1). With this, the fault management service understands that there is some fault associated with the asset (DCS1), but not able to comprehend the fault using the first information. For such reason, the fault management service identifies a second monitoring service (L3_app1) utilizing a second information (labelled with tag T2.1) associated with the same asset i.e. DCS1. Identification of the second monitoring service (L3_app1) enables development of asset equivalence between the first monitoring service (cloud app1) and the second monitoring service (L3_app1) i.e. understanding that both monitoring services relate to and derive information from the same asset, DCS1.

From T2.1 asset context of the second monitoring service (L3_app1), related asset hierarchy in second monitoring service (L3_app1) is identified. Thereupon, all events and alarms involving the second information with the tag T2.1 are shortlisted. Generalizing the relation for a KPI2 utilizing information associated with tags T1, T2, T3 . . . Tn, below mentioned relation could be established.

$$KPI2 = f(T1, T2, T3 \ldots Tn)$$

Figure 5:
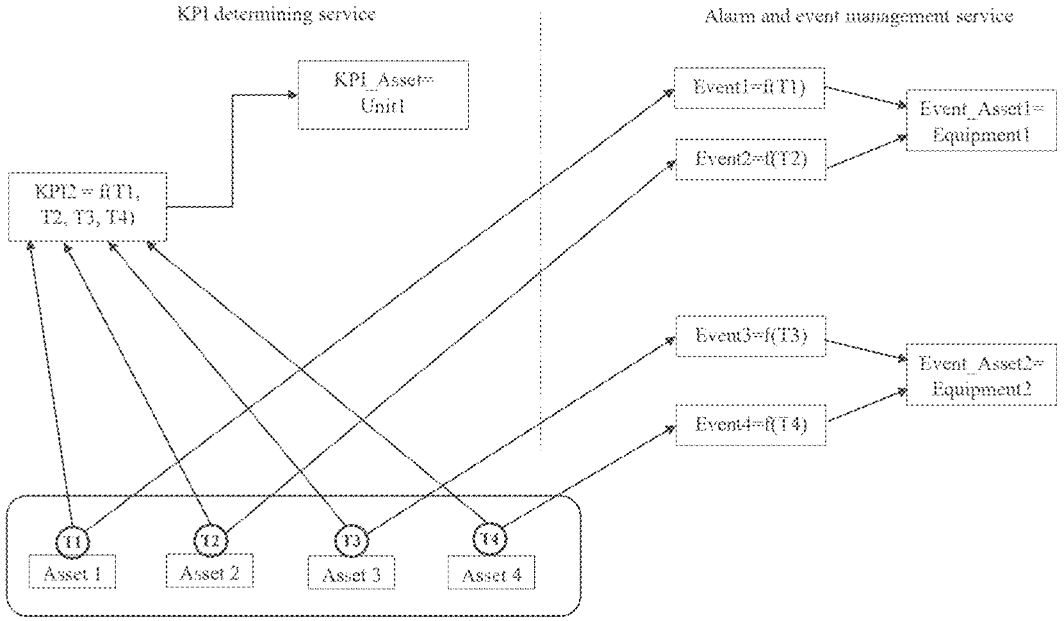
FIG. 5 illustrates an information flow diagram for determining asset context equivalence between different monitoring services, in accordance with an embodiment of the present disclosure.

Upon tracing the tags to the asset DCS1 and then tracing the tags to the second monitoring service (L3_app1), following relations could be derived, as illustrated in FIG. 5.

$$Event1 = f(T1)$$

$$Event2 = f(T2)$$

$$Event3 = f(T3)$$

$$Event4 = f(T4)$$

In all the above mentioned relations, f( ) means a function of, for example event1=f(T1) means evant1 is a function of information associated with tag T1.

FIG. 5 illustrates an information flow diagram for determining asset context equivalence between different monitoring services, in accordance with an embodiment of the present disclosure. As illustrated, the first monitoring service may be a KPI determining service and the second monitoring service may be an alarm and event management service. FIG. 5 provides a visual representation of all the relations mentioned above with reference to FIG. 4.

It could be seen that Unit1 which is a part of the KPI determining service utilizes information associated with the tags T1, T2, T3, and T4. Equipment1 and Equipment2 are a part of the alarm and event management service. Equipment1 utilizes information associated with the tags T1 and T2, and Equipment2 utilizes information associated with the tags T3 and T4. Therefore, it could be derived that the Unit1 is related to the Equipment1 and Equipment2, for deriving information from the same assets i.e. asset 1, asset 2, asset 3, and asset 4. In this manner, asset context equivalence could be established between different services when information received from a service isn't enough or useful for locating a fault/anomaly associated with an asset.

To understand exact relationship between the Unit1 and the Equipment1 and Equipment2, events and alarms related to the Equipment1 and Equipment2 could be analysed in detail. During a detailed analysis, the tag lineage could be referred for identification of upstream and downstream devices operating at different network levels. The upstream devices refer to devices operating at a higher network level and the downstream devices refer to devices operating at a lower network level, while analysing flow of a data stream. Upon identification of the upstream and downstream devices, events and alarms configured on the upstream and downstream devices may be tracked and analysed for determining the exact relationship between the Unit1 and the Equipment1 and Equipment2.

Figure 6:
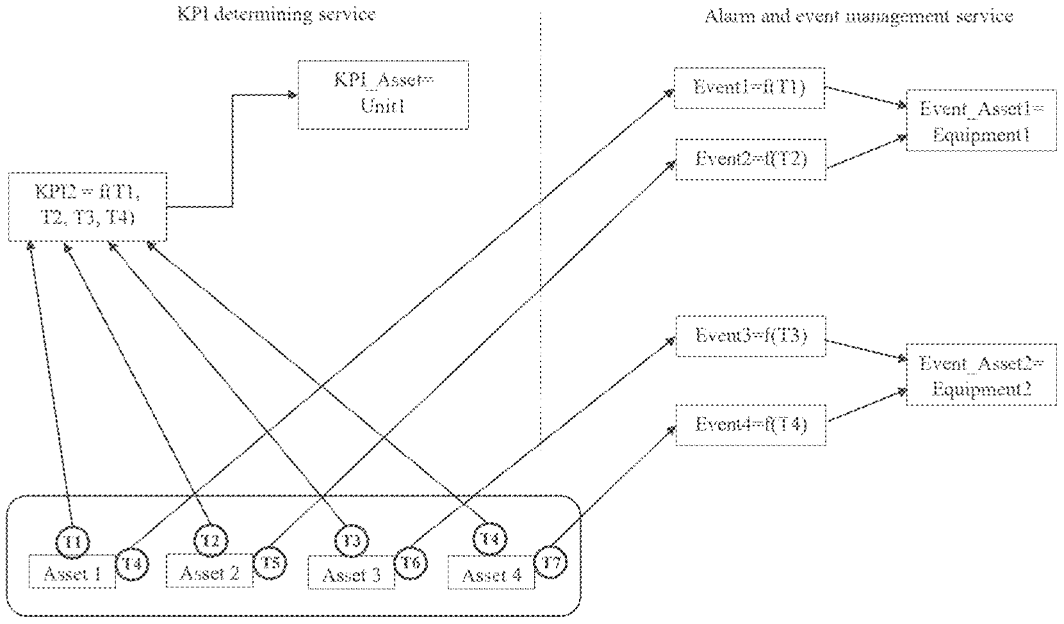
FIG. 6 illustrates an information flow diagram for determining asset context equivalence between different monitoring services, in accordance with another embodiment of the present disclosure.

FIG. 6 illustrates an information flow diagram for determining asset context equivalence between different monitoring services, in accordance with another embodiment of the present disclosure. Similar to FIG. 5, the KPI determining service is the first monitoring service and the alarm and event management service is the second monitoring service.

It could be seen that the Unit1 which is a part of the KPI determining service utilizes information associated with the tags T1, T2, T3, and T4. Therefore, below mentioned relation could be established.

$$KPI2 = f(T1, T2, T3 \ldots T4)$$

Upon tracing the tag T1 to the associated asset1, it is observed that the tag T1 is not used by the alarm and event management service. In such scenario, other tags used by the alarm and event management service may be scanned. Through scanning, it may be determined that tag T4 is used by the alarm and event management service. For example, below relations could be determined based on the scanning.

$$Event1 = f(T4)$$

$$Event2 = f(T5)$$

$$Event3 = f(T6)$$

$$Event4 = f(T7)$$

Therefore, it could be derived that the Unit1 is related to the Equipment1 and Equipment2, for deriving information from the same assets i.e. asset 1, asset 2, asset 3, and asset 4. In this manner, asset context equivalence could be established between the KPI determining service and the alarm and event management service.

To understand exact relationship between the Unit1 and the Equipment1 and Equipment2, events and alarms related to the Equipment1 and Equipment2 could be investigated in detail, as described previously.

Figure 7:
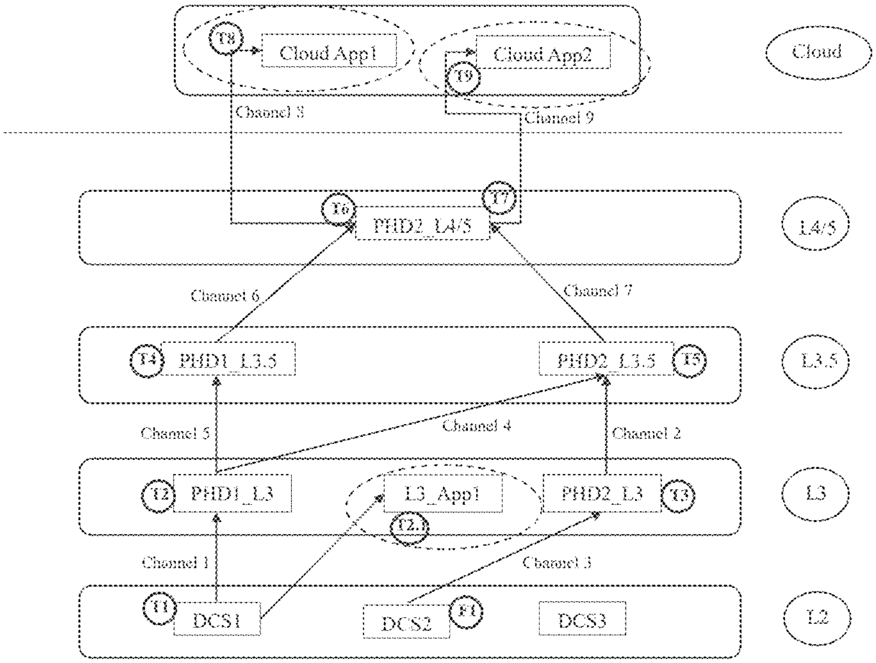
FIG. 7 illustrates an information flow diagram for several monitoring services, in accordance with an embodiment of the present disclosure; and FIGS. *8a* and *8b* illustrate a flow chart of a method of determining asset context equivalence, in accordance with an embodiment of the present disclosure.

FIG. 7 illustrates an information flow diagram for several monitoring services, in accordance with an embodiment of the present disclosure. As illustrated, assets DCS1, DCS2, and DCS3 are operating at a network level L2. A first monitoring service (cloud app1) runs at a network cloud, utilizes data originating from the asset DCS1, and has a tag lineage T8-T6-T4-T2-T1. A second monitoring service (cloud app2) also runs at the network cloud, utilizes data originating from the asset DCS2, and has a tag lineage T9-T7-T5-T3-F1. A third monitoring service (L3_app1) runs at the network level L2, utilizes data originating from the asset DCS1, and has a tag lineage T2.1-T1. The fault management service running over the system 102 may process details of tag lineage for all the monitoring services and automatically establish asset equivalence between different assets operating in same or different enterprise. For example, the fault management service may determine that information associated with the tags T2 and T3 is collected by different devices (PHD1_L3 and PHD2_L3 respectively) operating at same network levels in an enterprise. In this manner, asset context equivalence could be established for different devices operating in same or different locations of an enterprise.

Thereupon, the fault management service performs a root cause analysis by processing the second information or the third information, to determine a cause of the deviation in the KPI value. Root cause analysis helps in reducing incident Mean-Time-To-Resolution (MTTR) and avoiding minutes or hours of downtime due to system failure in an enterprise. The process of performing root cause analysis can be automated using techniques including bigdata analysis, machine learning. and artificial intelligence. In one scenario, by performing the root cause analysis, the fault management service identifies a fault associated with the asset (DCS1).

Upon identifying the root cause, the fault management service takes one or more corrective actions to address the fault, to bring the KPI value in a required range. The corrective actions may be taken by referring to the corrective action information 222 stored in the memory 206. The corrective actions may be one of the several mentioned below.

a) Segmentation: Affected asset/component can be isolated to prevent further impact on the network or service.
b) Notification and communication: Relevant personnel such as machine operators or their managers could be notified about the fault, ensuring quick awareness and response.
c) Service restart or device reboot: The affected asset or application could be restarted to restore functionality.
d) Configuration changes: Device configurations could be adjusted to eliminate conflicts or misconfigurations causing the fault. Reverting to a previous stable configuration could be considered if recent changes led to the fault.
e) Patch management: Software patches or updates could be installed to fix known vulnerabilities or bugs related to the fault. Software versions could be upgraded to enhance performance and stability.
f) Resource optimization: Load balancing could be performed by distributing workloads more evenly across servers or resources to alleviate bottlenecks. Additional resources could be added or allocated to handle increased demand (e.g., bandwidth, processing power).
g) Backup and restore: Data restoration could be done to restore data from backups if corruption or loss has occurred due to the fault. Disaster recovery plans could be utilized to restore operations following major faults.
h) Monitoring and prevention: Monitoring tools could be enhanced to provide better visibility into system performance and potential faults. Further, thresholds could be set for KPIs to proactively identify issues before they escalate.
i) Training and awareness: Operations and safety trainings could be conducted for operators to ensure suitable operation of machineries and troubleshooting of faults by them.

Figure 8A:
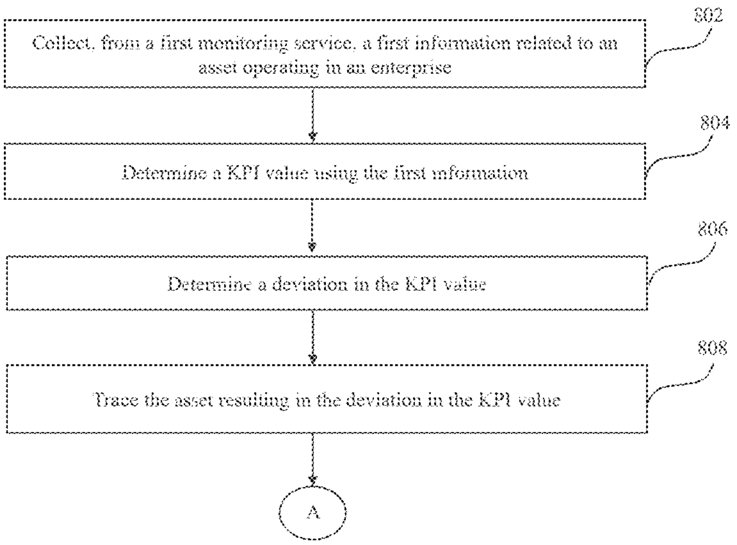
Figure 8B:
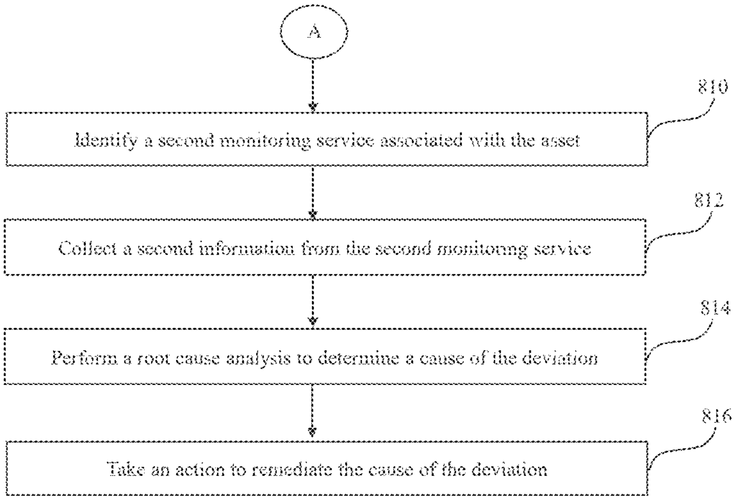

FIGS. 8*a* and 8*b* illustrate a flow chart of a method of determining asset context equivalence, in accordance with an embodiment of the present disclosure. In this regard, each block may represent a module, segment, or portion of code, which comprises one or more executable instructions for implementing the specified logical function(s). It should also be noted that in some alternative implementations, the functions noted in the blocks may occur out of the order noted in the drawings. For example, two blocks shown in succession in FIG. 8 may in fact be executed substantially concurrently or the blocks may sometimes be executed in the reverse order, depending upon the functionality involved. Any process descriptions or blocks in flow charts should be understood as representing modules, segments, or portions of code which include one or more executable instructions for implementing specific logical functions or steps in the process, and alternate implementations are included within the scope of the example embodiments in which functions may be executed out of order from that shown or discussed, including substantially concurrently or in reverse order, depending on the functionality involved. In addition, the process descriptions or blocks in flow charts should be understood as representing decisions made by a hardware structure such as a state machine.

At step 802, a first information related to an asset is collected from a first monitoring service. The asset may be one of a plurality of assets operating in an enterprise, such as machineries and sensors. The first monitoring service may be operational at one of a plurality of network levels. The first information may include at least one tag assigned at each of the plurality of network levels traversed by the first information for reaching the first monitoring service from the asset.

At step 804, a Key Performance Indicator (KPI) value of the first monitoring service may be determined using the first information. The KPI value may be determined by combining values of different operational parameters included in the first information.

At step 806, a deviation in the KPI value of the first monitoring service may be determined. The deviation in the KPI value may be determined upon comparison of the KPI value with a threshold KPI value. The threshold KPI value may be user defined or set based on historical performance of the first monitoring service.

At step 808, the asset associated with the first information resulting in the deviation in the KPI value may be traced. The asset may be traced using the at least one tag assigned at each of the plurality of network levels. The at least one tag assigned at each of the plurality of network levels may include timestamps and asset identifiers. Further, the at least one tag may be stored in a sequentially linked manner to form tag lineage.

At step 810, a second monitoring service associated with the asset may be identified. The second monitoring service may be operational at a same or different network levels than that of the first monitoring service. The second monitoring service may be identified to determine asset equivalence between the first monitoring service and the second monitoring service.

At step 812, a second information related to the asset may be collected from the second monitoring service. In one scenario, the second monitoring service may utilize the second information associated with another asset operating in the enterprise.

At step 814, a root cause analysis may be performed to determine a cause of the deviation in the KPI value. The root cause analysis may be performed by processing the second information.

At step 816, an action related to the asset may be taken to remediate the cause of the deviation in the KPI value. The action related to the asset includes segmentation, notification and communication, service restart or device reboot, configuration changes, patch management, resource optimization, backup and restore, and monitoring and prevention.

Implementing effective corrective actions in fault management not only resolves immediate issues but also contributes to long-term stability and reliability of systems. By continually analyzing faults and refining processes, enterprises can enhance their overall fault management strategies.

The machineries for which asset context equivalence is determined may be of different types depending on a type of enterprise for which the proposed system and method is implemented. For example, the machinery may be a manufacturing machinery, such as a Computerized Numeric Control (CNC) machine, lathe, or milling machine. The machinery could also be a construction machinery, such as excavator, bulldozer, or crane. The machinery could also be an agricultural machinery like tractor, harvester, or plow. The machinery could also be a mining machinery like dragline, continuous miner, or a dump truck. The machinery could also be a food processing machinery like a mixer, packaging machines, or a pasteurizer. The machinery could also be a textile machinery like a spinning machine, weaving loom, or a knitting machine. The machinery could also be a printing machinery like an offset printing press, digital printer, or a screen-printing machine. The machinery could also be a woodworking machinery like a saw, planer, or a sander.

In an Information Technology (IT) enterprise, the machinery/machine may be a server like a web server or a database server. The machine may also be a workstation like a graphics workstation or a CAD workstations. The machine may also be a personal computer like a desktop or a laptop. The machine may also be a network device like a router or a network switch. The machine may also be a storage device like a Hard Disk Drive (HDD), Solid State Drive (SSD), or a Network Attached Storage (NAS). The machine may also be a mainframe, supercomputer, or a thin client. The machine may also be an embedded system like an Internet of Things (IoT) device or an industrial control system. The machine may also be a networking equipment like firewall or access point.

The sensors referenced above may be any of temperature sensors, humidity sensors, pressure sensors, proximity sensors, flow sensors, light sensors, motion sensors, vibration sensors, gas sensors, Radio Frequency Identification (RFID) sensors, ultrasonic sensors, or the like.

The term network cloud referenced above refers to the integration of networking and cloud computing, allowing users to access, store, and manage data and applications over the internet rather than relying solely on local servers or personal devices. Network clouds enable scalability, flexibility, and cost efficiency in managing IT resources. The can be public clouds, private clouds, hybrid clouds, and multi-clouds. Through the public clouds, services are delivered over the internet and shared across multiple organizations. Providers like Amazon Web Services (AWS), Microsoft Azure, and Google Cloud Platform (GCP) offer resources that are accessible to anyone who wants to use them. The private clouds are available for exclusive use by an organization, offering greater control over data, security, and compliance. The private clouds can be hosted on-premises or by a third-party provider. The hybrid clouds combine public and private clouds, allowing data and applications to be shared between them. Organizations can maintain sensitive data on a private cloud while leveraging the scalability of a public cloud for less sensitive workloads. The multi-clouds involve using services from multiple cloud providers, which can include public, private, or hybrid clouds. Organizations may choose this approach to avoid vendor lock-in and to leverage the best services from different providers. The network clouds may provide Infrastructure as a Service (IaaS), Platform as a Service (PaaS), or Software as a Service (SaaS).

The network levels referenced above refer to various layers or stages in a network architecture that define how data is transmitted, processed, and managed across different components. The network levels/layers include physical layer, data link layer, network layer, transport layer, session layer, presentation layer, and application layer. The physical layer is lowest level of a network, responsible for dealing with physical connection between devices, such as cables, switches, and other hardware. Primary function of this layer is to transmit raw binary data (0s and 1s) over physical mediums such as Ethernet cables, fiber optics, and wireless signals. The data link layer is responsible for node-to-node data transfer and error detection/correction, handling MAC addressing, framing, and flow control. The network layer is responsible for managing routing of data packets across multiple networks. This layer uses protocols like Internet Protocol (IP) to handle addressing (IP addresses) and routing decisions. The transport layer ensures complete data transfer and provides error recovery and flow control between end systems. This layer utilizes Transmission Control Protocol (TCP) protocol for reliable communication and User Datagram Protocol (UDP) protocol for faster, connectionless communication. The session layer is responsible for managing sessions between applications, establishing, maintaining, and terminating connections. This layer facilitates communication sessions, allowing applications to exchange data, e.g., APIs, remote procedure calls. The presentation layer translates data between the application layer and the network, handling data encoding and encryption. The application layer is topmost layer where end-user applications and services operate, enabling user interaction with the network. This layer utilizes protocols like Hyper Text Transfer Protocol (HTTP), File Transfer Protocol (FTP), Simple Mail Transfer Protocol (SMTP), and Domain Name Server (DNS).

In the above description, for purposes of explanation, numerous specific details are set forth in order to provide a thorough understanding of the present systems and methods. It will be apparent the systems and methods may be practiced without these specific details. Reference in the specification to "an example" or similar language means that a particular feature, structure, or characteristic described in connection with that example is included as described, but may not be included in other examples.

Those skilled in the art will understand that any number of nodes, devices, links, etc. may be used in the cloud network, and that the view shown herein is for simplicity. Also, those skilled in the art will further understand that while the cloud network is shown in a certain orientation, the cloud network is merely an example illustration that is not meant to limit the disclosure. For example, "real-world" cloud networks may comprise any type of network, including, among others, Fog networks, IoT networks, core networks, backbone networks, data centers, enterprise networks, provider networks, customer networks, virtualized networks (e.g., virtual private networks or "VPNs"), combinations thereof, and so on. Note further that the network environments and their associated devices may also be located in different geographic locations.

The terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

Any combination of the above features and functionalities may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set as claimed in claims that issue from this application, in the specific form in which such claims issue, including any subsequent correction.

We claim:

1. A method, comprising:

collecting, from a first monitoring service running at one of a plurality of network levels, a first information related to an asset of a plurality of assets operating in an enterprise, wherein the first information includes at least one tag assigned at each of the plurality of network levels traversed by the first information for reaching the first monitoring service from the asset;

determining a Key Performance Indicator (KPI) value of the first monitoring service, using the first information;

determining a deviation in the KPI value of the first monitoring service upon comparison with a threshold KPI value;

tracing the asset associated with the first information resulting in the deviation in the KPI value, wherein the asset is traced using the at least one tag assigned at each of the plurality of network levels;

identifying a second monitoring service associated with the asset, to determine asset equivalence between the first monitoring service and the second monitoring service, wherein the second monitoring service runs at one of the plurality of network levels;

collecting, from the second monitoring service, a second information related to the asset;

performing a root cause analysis, by processing the second information, to determine a cause of the deviation in the KPI value; and taking an action related to the asset to remediate the cause of the deviation in the KPI value.

2. The method as claimed in claim 1, wherein the plurality of assets include machineries and sensors operating in the enterprise.

3. The method as claimed in claim 1, wherein the KPI value is determined by combining values of different operational parameters included in the first information.

4. The method as claimed in claim 1, wherein the threshold KPI value is user defined.

5. The method as claimed in claim 1, wherein the threshold KPI value is set based on historical performance of the first monitoring service.

6. The method as claimed in claim 1, wherein the at least one tag assigned at each of the plurality of network levels include timestamps and asset identifiers.

7. The method as claimed in claim 1, wherein the action related to the asset includes segmentation, notification and communication, service restart or device reboot, configuration changes, patch management, resource optimization, backup and restore, and monitoring and prevention.

8. The method as claimed in claim 1, wherein the at least one tag assigned at each of the plurality of network levels are stored in a sequentially linked manner.

9. The method as claimed in claim 1, wherein the first monitoring service and the second monitoring service are configured to operate at different network levels.

10. The method as claimed in claim 1, wherein the second monitoring service utilizes the second information associated with another asset operating in the enterprise.

11. A system comprising:

a processor; and a memory coupled with the memory, wherein the memory stores program instructions configured to:

collect, from a first monitoring service running at one of a plurality of network levels, a first information related to an asset of a plurality of assets operating in an enterprise, wherein the first information includes at least one tag assigned at each of the plurality of network levels traversed by the first information for reaching the first monitoring service from the asset;

determine a Key Performance Indicator (KPI) value of the first monitoring service, using the first information;

determine a deviation in the KPI value of the first monitoring service upon comparison with a threshold KPI value;

trace the asset associated with the first information resulting in the deviation in the KPI value, wherein the asset is traced using the at least one tag assigned at each of the plurality of network levels;

identify a second monitoring service associated with the asset, to determine asset equivalence between the first monitoring service and the second monitoring service, wherein the second monitoring service runs at one of the plurality of network levels;

collect, from the second monitoring service, a second information related to the asset;

perform a root cause analysis, by processing the second information, to determine a cause of the deviation in the KPI value; and take an action related to the asset to remediate the cause of the deviation in the KPI value.

12. The system as claimed in claim 11, wherein the plurality of assets include machineries and sensors operating in the enterprise.

13. The system as claimed in claim 11, wherein the KPI value is determined by combining values of different operational parameters included in the first information.

14. The system as claimed in claim 11, wherein the threshold KPI value is user defined or is set based on historical performance of the first monitoring service.

15. The system as claimed in claim 11, wherein the at least one tag assigned at each of the plurality of network levels include timestamps and asset identifiers.

16. The system as claimed in claim 11, wherein the action related to the asset includes segmentation, notification and communication, service restart or device reboot, configuration changes, patch management, resource optimization, backup and restore, and monitoring and prevention.

17. The system as claimed in claim 11, wherein the at least one tag assigned at each of the plurality of network levels are stored in a sequentially linked manner.

18. The system as claimed in claim 11, wherein the first monitoring service and the second monitoring service are configured to operate at different network levels.

19. The system as claimed in claim 11, wherein the second monitoring service utilizes the second information associated with another asset operating in the enterprise.

20. A non-transitory computer-readable storage medium comprising computer program code for execution by one or more processors of an apparatus, the computer program code configured to, when executed by the one or more processors, cause the apparatus to:

collect, from a first monitoring service running at one of a plurality of network levels, a first information related to an asset of a plurality of assets operating in an enterprise, wherein the first information includes at least one tag assigned at each of the plurality of network levels traversed by the first information for reaching the first monitoring service from the asset;

determine a Key Performance Indicator (KPI) value of the first monitoring service, using the first information;

determine a deviation in the KPI value of the first monitoring service upon comparison with a threshold KPI value;

trace the asset associated with the first information resulting in the deviation in the KPI value, wherein the asset is traced using the at least one tag assigned at each of the plurality of network levels;

identify a second monitoring service associated with the asset, to determine asset equivalence between the first monitoring service and the second monitoring service, wherein the second monitoring service runs at one of the plurality of network levels;

collect, from the second monitoring service, a second information related to the asset;

perform a root cause analysis, by processing the second information, to determine a cause of the deviation in the KPI value; and take an action related to the asset to remediate the cause of the deviation in the KPI value.

* * * * *